United States Patent [19]
Yoo

[11] Patent Number: 5,567,023
[45] Date of Patent: Oct. 22, 1996

[54] 3-POSITION 3-WAY SOLENOID VALVE

[75] Inventor: Jang-Yeol Yoo, Seoul, Rep. of Korea

[73] Assignee: Daewoo Electronics Co., Ltd., Seoul, Rep. of Korea

[21] Appl. No.: 535,579

[22] Filed: Sep. 28, 1995

[30] Foreign Application Priority Data

Sep. 28, 1994 [KR] Rep. of Korea .................. 94-24459

[51] Int. Cl.⁶ ........................................... B60T 8/36
[52] U.S. Cl. .................. 303/119.2; 137/596.17; 251/129.19
[58] Field of Search .............. 303/119.2, 115.2; 137/596.17; 251/129.19

[56] References Cited

U.S. PATENT DOCUMENTS

| 5,234,030 | 8/1993 | Kervagoret et al. | 303/119.2 |
| 5,299,859 | 4/1994 | Tackett et al. | 303/199.2 |
| 5,333,945 | 8/1994 | Volz et al. | 303/119.2 |

*Primary Examiner*—Matthew C. Graham
*Attorney, Agent, or Firm*—Fish & Richardson, P.C.

[57] ABSTRACT

A 3-position 3-way solenoid valve for an anti-lock brake system simplifies a structure of a modulator block and has an excellent assemblage with the modulator block. The solenoid valve has a first chamber communicated with an inlet port and outlet port and a second chamber communicated with the first chamber via a barrier-wall hole in a barrier wall, in which the first chamber includes an inlet valve for opening/closing the inlet port, an outlet valve for opening/closing a through hole, a plunger, a first spring between the inlet valve and plunger, a second spring between the plunger and outlet valve and a cylinder having one end connected to the outlet valve no accommodate the inlet valve, and a second chamber communicated with an exhaust port includes an armature. One end of a push rod is fixed to the armature and extends to the first chamber via the barrier-wall hole and thruhole in the outlet valve, and other end thereof is coupled to the plunger.

9 Claims, 5 Drawing Sheets

3-POSITION 3-WAY SOLENOID VALVE

BACKGROUND OF THE INVENTION

1. Field of the Invention

The present invention relates to a 3-position 3-way solenoid valve for an anti-lock brake system, and more particularly to a 3-position 3-way solenoid valve for an anti-lock brake system having excellent assemblage and workability with a simple structure.

2. Description of the Prior Art

Currently, an anti-lock brake system which prevents locking of wheels during performing a braking operation of a vehicle to shorten a braking distance and improve steering is mounted to various vehicles. If wheels are locked during the braking operation to slide along a road surface, a frictional force between tires and the road surface is decreased to lengthen the braking distance and abruptly degrade a steering performance of a vehicle. The anti-lock brake system repeatedly increases, maintains or decreases a braking pressure exerting upon the wheels to impede the locking of wheels. It is generally referred to that the increase of the braking pressure is designated as a increase mode, maintaining thereof is a hold mode and decreasing thereof is a decrease mode. The anti-lock brake system is generally formed of a pressure generating source which is not a master cylinder, i.e., a pump and the like, valves operated by an electric signal, sensors for monitoring a rotating speed of the wheels and a controller for opening/closing the valves in accordance with a predetermined algorithm for attaining an effective braking operation.

Figure 1:
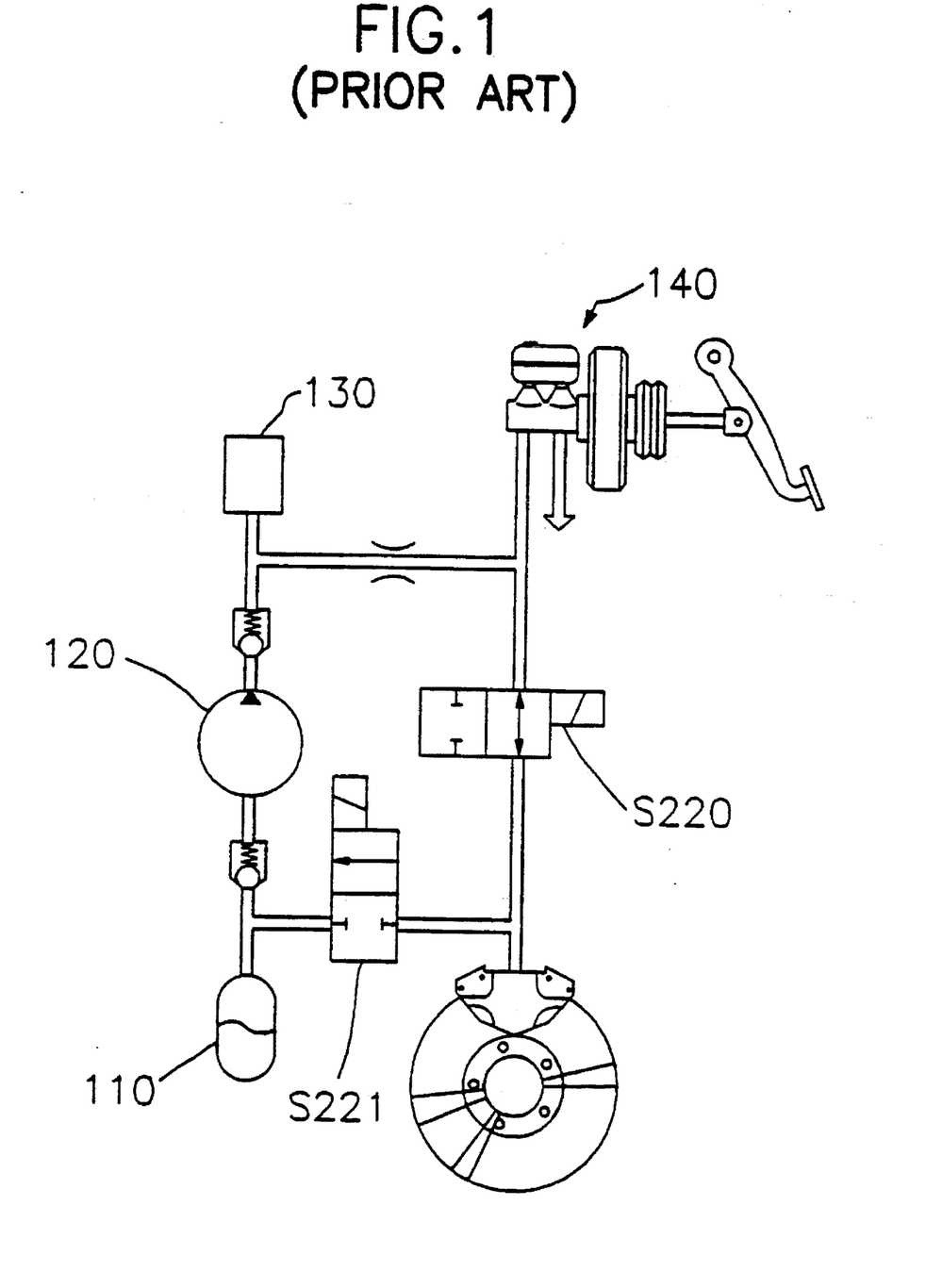
FIG. 1 is a schematic view showing a hydraulic system of a conventional anti-lock brake system utilizing 2-position 2-way solenoid valves.

FIG. 1 is a schematic circuit diagram of a hydraulic system showing a conventional anti-lock brake system utilizing two 2-position 2-way (hereinafter simply referred to as "2/2") solenoid valves of normally open and normally close types a increase mode, current is not supplied to first and second 2/2 solenoid valves S220 and S221 to open first valve S220 an outlet side of a hydraulic pump 110 and close second valve S221 at an inlet side of hydraulic pump 110, so that an oil pressure generated from hydraulic pump 110 is supplied to a brake wheel cylinder mounted to the wheel. In a static pressure mode, a current signal is supplied to first valve S220 to close first valve S220, thereby constantly maintaining the pressure of the brake wheel cylinder. In a decrease mode, the current signal is supplied to first and second valves S220 and S221 to close first valve S220 and open second valve S221, so that the pressure in the brake wheel cylinder is decreased. Such a system is stably operated, but two solenoid valves are employed with respect to a single channel to require eight solenoid valves in a 4-channel brake system. Therefore, the required number of valves are increased, and the overall brake system becomes bulky.

Meanwhile, in order to reduce the number of solenoid valves, an anti-lock brake system using a 3-position 3-way solenoid valve as shown in FIG. 4 has been developed to be currently available. When the 3-position 3-way solenoid valve is used, one solenoid valve is used per channel to reduce the required number of solenoid valves by half when compared with using the 2/2 solenoid valves.

Figure 2:
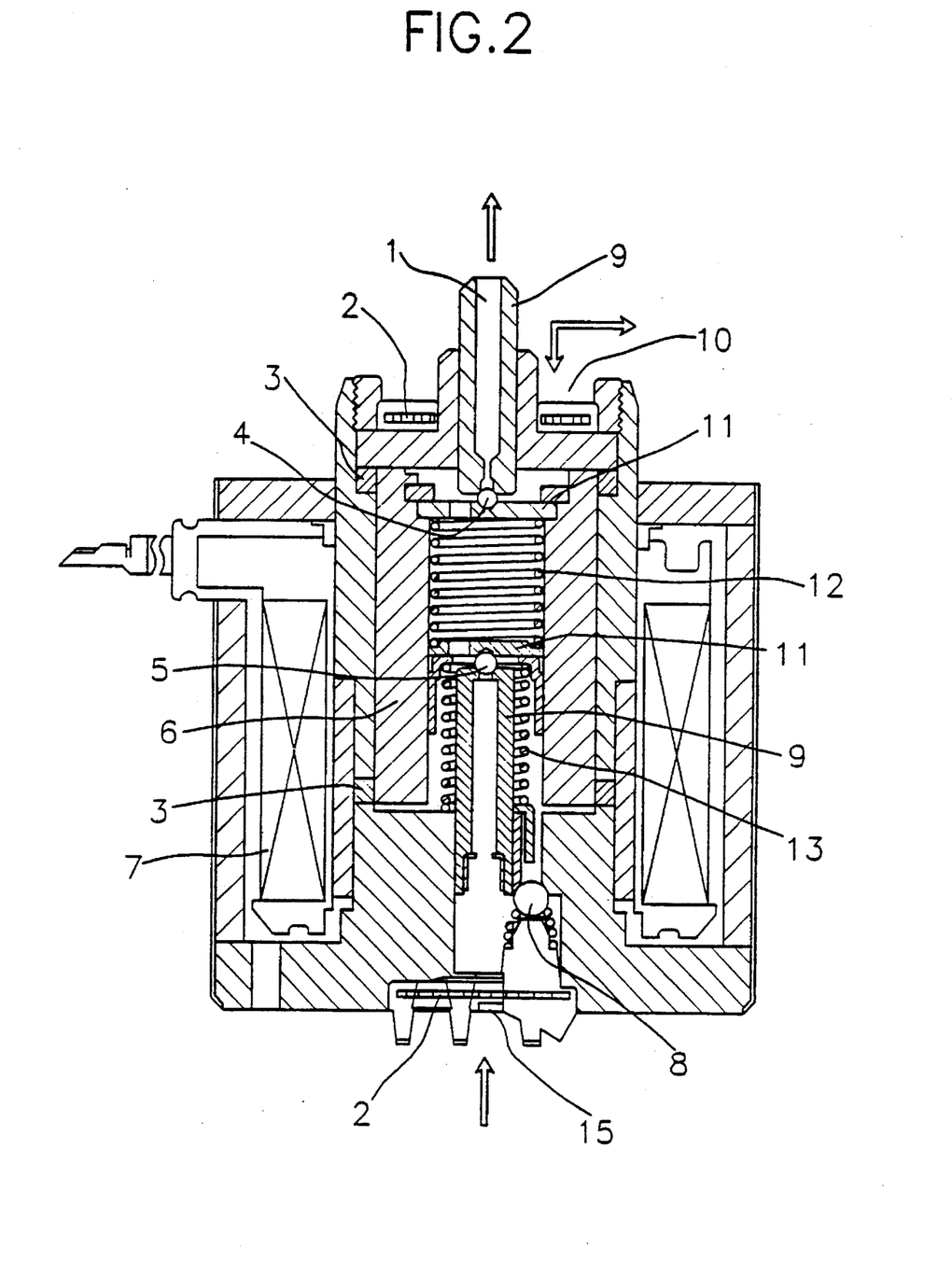
FIG. 2 is a sectional view showing a conventional 3-position 3-way solenoid valve.

FIG. 2 is a sectional view showing a conventional 3-position 3-way solenoid valve manufactured by BOSCH Co., in which an internal valve chamber is prevented from being contaminated by means of a filter 2 at the inlet and outlet thereof. A valve body 9 having a flow passage therein is placed immediately in front of an inlet valve 5 and immediately at the back of an outlet valve 4. The flow passage is opened/closed by inlet valve 5 and outlet valve 4. For the purpose of securing high reliability and minimum friction, an armature 6 is led by a non-magnetic bearing ring 3. A main spring 13 and an auxiliary spring 12 are installed in the center portion. A steel ball is soldered onto a carrier plate 11 to serve as a sealing member. A winding 7 is wrapped by a plastic to be protected from becoming wet by fluid. A first port 15 is communicated with a master cylinder 140 (refer to FIG. 5) and pump 120 (refer to FIG. 5), respectively. A second port 10 is communicated with a brake wheel cylinder mounted to a wheel, and a third port 1 is communicated with an accumulator 110 (refer to FIG. 5). A check valve 8 disposed in parallel with inlet valve 5 is opened when a brake is released to enable abrupt draining.

In the conventional 3-position 3-way solenoid valve as shown in FIG. 2, the flow passage is formed by penetrating the solenoid valve. If the solenoid valve is used to form a modulator, a modulator block is divided into upper and lower blocks to have respective flow passages connected to the respective ports of the solenoid valve. As the result, the structure of the modulator is complicated to deteriorate the assemblage as well as degrade workability.

SUMMARY OF THE INVENTION

The present invention is devised to solve the foregoing problems. It is an object of the present invention to provide a 3-position 3-way solenoid valve having a simple structure, and capable of simplifying a structure of a modulator block and being constructed to be easily assembled with the modulator block.

To achieve the above object of the present invention, there is provided a 3-position 3-way solenoid valve comprising:

a valve body having a housing with an inlet port for receiving fluid from a fluid generating source, an outlet port for admitting/discharging the fluid and an exhaust port for exhausting the fluid, and a cover airtightly coupled to the housing for closing one end of the housing;

a barrier wall for dividing chambers formed by the housing and cover within the valve body into a first chamber communicated with the inlet port and outlet port and a second chamber communicated with the exhaust port, having a barrier-wall hole for communicating the first chamber with the second chamber;

opening/closing means movable along the lengthwise direction of the valve body for selectively opening and closing the barrier-wall hole and inlet port in accordance with an electric signal, functioning by allowing the inlet port to communicate with the outlet port, the outlet port to communicate with the exhaust port and the inlet port, outlet port and exhaust port to be closed, and being placed at a first position of closing the barrier-wall hole in a normal state that the electric signal is not supplied, at a second position of closing the barrier-wall hole and inlet port in a first active state that a first electric signal being a hale of maximum current is supplied and at a third state of opening the barrier-wall hole in a second active state that a second electric signal having the maximum current is supplied; and a solenoid assembly having a ring-shaped solenoid coil, a bobbin wound by the solenoid coil and an electrode electrically connected to the solenoid coil to be exposed to the outside of the valve body for moving the opening/closing means on the first position when the electric signal is not supplied to the second position upon the supply of the first electric signal and then to the third position upon the supply of the second electric signal.

Preferably, the opening/closing means comprises:

valve means having an inlet valve for opening/closing the inlet port, an outlet valve with a thruhole for opening/closing the barrier-wall hole, a plunger between the inlet valve and outlet valve with O-shaped rings around the outer circumference thereof for preventing the leakage of the fluid, a first spring interposed between the inlet valve and plunger, a second spring interposed between the plunger and outlet valve, and a cylinder of which one end is fixed to the outlet valve and other end has steps for limiting the movement position of the inlet valve and accommodating the inlet valve, first spring, plunger and second spring therein;

an armature moved in response to a magnetic force produced by the solenoid assembly;

a push rod divided into an enlarged portion with a larger diameter and a reduced portion with a smaller diameter, one end of the enlarged portion fixed to the armature and extending to the first chamber via the barrier-wall hole and thruhole, one end of the reduced portion connected to the plunger;

a third spring for receiving the push rod therethrough, one end of which is supported by the barrier wall, other end of which is supported by the armature; and a core provided to the second chamber for receiving the third spring and push rod therethrough and pulling the armature by generating the magnetic force in response to a magnetic flux produced from the solenoid coil, whereby a diameter of the barrier-wall hole is determined to permit the enlarged portion of the push rod to pierce through, a diameter of the thruhole is determined to block the enlarged portion of the push rod while allowing for the penetration by the reduced portion, so that the end of the enlarged portion connected to the reduced portion at the first position is to be spaced from the outlet valve to permit the barrier-wall hole to maintain the closing state at the second position.

For example, the inlet port is an inlet nozzle bore formed to an inlet nozzle airtightly coupled to other end of the housing in opposition to the housing closed by the cover, the barrier wall is formed by an outlet nozzle, the diameter of the barrier-wall hole formed in the outlet nozzle is formed to be larger than that of the enlarged portion of the push rod which pierces through the barrier-wall hole, whereby a predetermined clearance is formed between the barrier-wall hole and enlarged portion to communicate the first chamber with the second chamber via the clearance.

The first chamber is formed by the inlet nozzle, barrier wall and an inner wall of the housing, and the chamber is formed by the barrier wall, cover, a cylindrical sealing member and an the inner wall of the housing, whereby the cylindrical sealing member is inserted with the bobbin, one end of the cylindrical sealing member is airtightly coupled to the inner wall of the housing not to contact the fluid within the first chamber, and other end thereof is airtightly inserted into the cover.

The inlet nozzle is provided with an inlet valve seating surface for seating the inlet valve, and the outlet nozzle is provided with an outlet valve seating surface for seating the outlet valve, and the inlet valve seating surface and outlet valve seating surface are shaped to match with the shapes of the inlet valve and outlet valve to close the inlet port and barrier-wall hole when the inlet valve and outlet valve are seated on the inlet valve seating surface and outlet valve seating surface, respectively.

Additionally, the solenoid valve of the present invention further comprises a bushing for supporting the push rod between the armature and barrier wall within the second chamber.

The inlet valve and outlet valve may be spherically shaped.

Preferably, the housing is provided with an L-shaped groove, first and second U-shaped grooves accepting the o-shaped rings for maintaining the airtight state of respective ports by being operated with an inner wall of a modulator block in case of being mounted to the modulator block, and the L-shaped groove is formed to the one end of the housing provided with the inlet port, the first U-shaped groove is provided between the outlet port and exhaust port, and the second U-shaped groove is provided between the other end of the housing coupled with the cover and exhaust port.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 3:
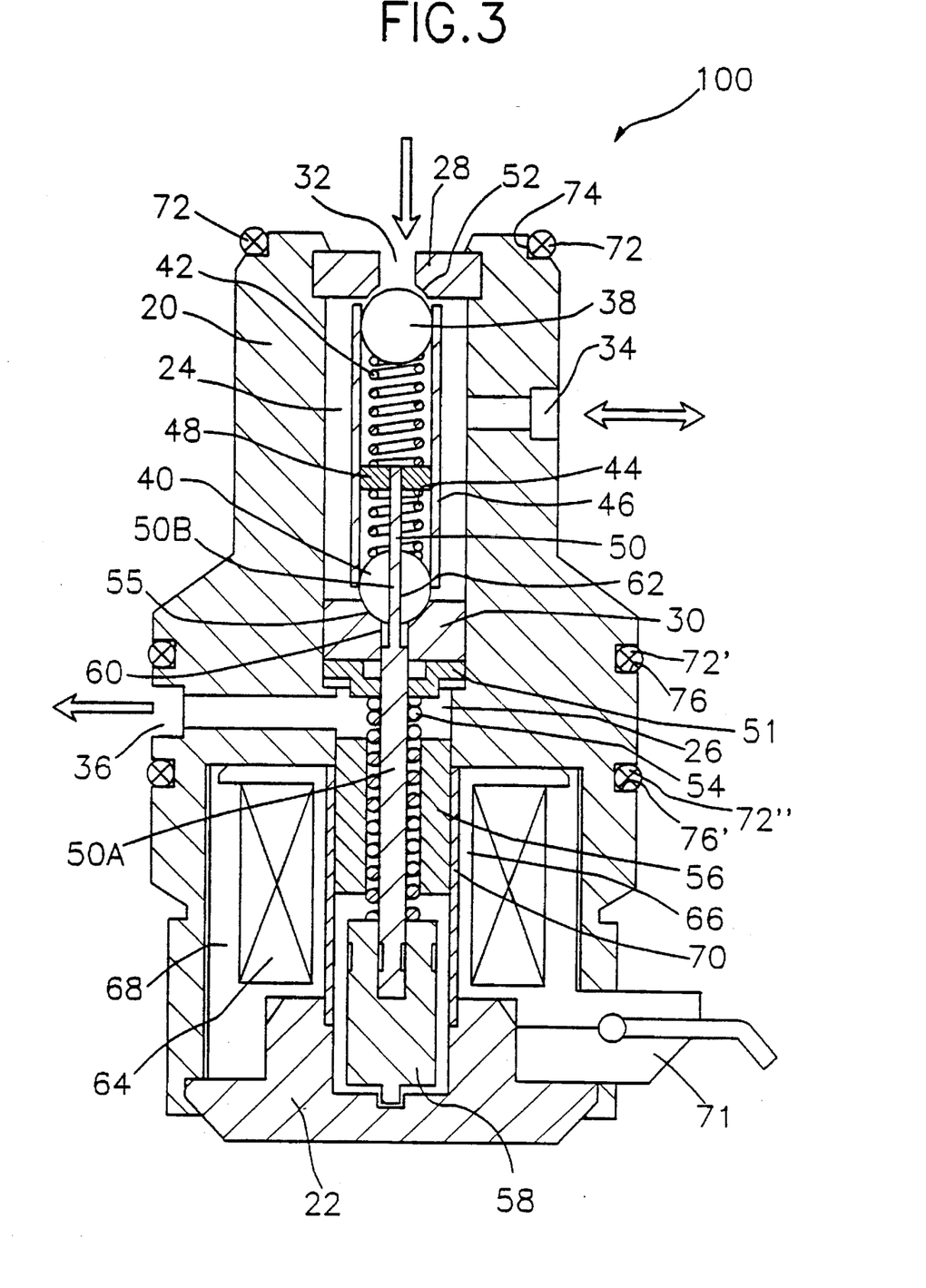
FIG. 3 is a sectional view showing a 3-position 3-way solenoid valve according to the present invention.

The preferred embodiment of a 3-position 3-way solenoid valve according to the present invention will be described in detail with reference to FIG. 3.

The 3-position 3-way solenoid valve 100 according to the present invention includes a cylindrical housing 20, and a cover 22 airtightly joined with one end of housing 20. A first chamber 24 and a second chamber 26 are formed within housing 20 by a barrier wall within the housing 20, in which first chamber 24 is formed by an inlet nozzle 28 and an outlet nozzle 30, and is communicated with an inlet port 32 and an outlet port 34. Also, second chamber 26 is formed by an outlet nozzle 30 and cover 22, and communicated with an exhaust port 36.

First chamber 24 includes an inlet valve 38, an outlet valve 40, a first spring 42, a second spring 44, a cylinder 46, a plunger 48 and a push rod 50. Inlet valve 38 functioning by opening/closing inlet nozzle 28 is inserted into cylinder 46 to reciprocate along the inner wall of cylinder 46. Though not illustrated, steps are provided at one end of cylinder 46 to which inlet valve 38 is placed for the purpose of preventing deviation of inlet valve 38 out of a certain length. Inlet valve 38 is spherically shaped in the drawings, but it is not necessarily restricted thereto. An outlet valve seating surface 52 formed to inlet nozzle 28 is shaped to match with inlet valve 38 to enable the opening/closing operation of inlet nozzle 28.

Outlet valve 40 functions for opening/closing outlet nozzle 30, and is soldered to one end of cylinder 46 while being disposed opposite to inlet valve 38. Outlet valve 40 is spherically shaped, although not necessarily restricted to the shape. An outlet valve seating surface 55 formed to outlet nozzle 30 is shaped to match with outlet valve 40 to enable the opening/closing operation of outlet nozzle 30.

Plunger 48 is installed between inlet valve 38 and outlet valve 40, and fixed to push rod 50 which pierces outlet valve 40 to reciprocate in conjunction with the movement of push rod 50. A first spring 42 is installed between inlet valve 38 and plunger 48 within cylinder 46, in which one end of first spring 42 is supported by inlet valve 38, and other end is supported by plunger 48. A second spring inserted into push rod 50 is installed between outlet valve 40 and plunger 48 within cylinder 46, in which one end of second spring is supported by plunger 48 and other end is supported by outlet valve 40.

Second chamber 26 includes push rod 50, a bushing 51, a third spring 54, a core 56 and an armature 58. Bushing 51 serves for supporting push rod 50, and has one or more flow holes for circulating fluid as well as an opening for insertedly receiving push rod 50 in the center of bushing 51. The shape and number of flow hole are not specifically limited, but determined to smoothly operate solenoid valve 100.

Push rod 50 is formed by two portions having different diameters, i.e., an enlarged portion 50A and a reduced portion 50B. One end of enlarged portion 50A having the larger diameter is inserted into armature 58 to be fixed thereto, and other end is coaxially joined to reduced portion 50B having the smaller diameter. Other end of reduced portion 50B is coupled to plunger 48 within first chamber 24. Enlarged portion 50A of push rod 50 extends up to an outlet nozzle bore 60 formed in outlet nozzle 30 via bushing 51 to be connected to reduction part 50B. Enlarged portion 50A and reduced portion 50B are integrally formed as one body. Reduced portion 50B extends via an outlet valve bore 62 formed by piercing through outlet valve 40 to be coupled with plunger 48.

The diameter of output nozzle bore 60 which receives push rod 50 therethrough is determined to allow for the reciprocation of enlarged portion 50A of push rod 50 by piercing through output nozzle bore 60. Also, the diameter of output valve bore 62 is determined to allow for the reciprocation of reduced portion 50B of push rod 50 by piercing therethrough.

In an inactive state of a solenoid coil 64, one end of enlarged portion 50A connected to reduced portion 50B of push rod 50 is spaced from outlet valve 40 by a predetermined length. The predetermined length is determined to move push rod 50 while blocking the movement of outlet valve 40 under the state that a first signal is supplied to solenoid coil 64.

The diameter of outlet nozzle bore 60 is formed larger than enlarged portion 50A of push rod 50 to form a clearance between push rod 50 and outlet nozzle bore 60. When outlet valve 40 is separated from outlet valve seating surface 55 through the clearance, first chamber 24 and second chamber 26 are communicated to each other. The dimensions of the clearance are determined to ensure a consistent valve operating characteristic.

Third spring 54 is installed by means of push rod 50, in which one end thereof is supported by bushing 51, and other end is supported by armature 58. Core 56 is fixed to the inner wall of housing 20 to encircle push rod 50 wound by third spring 54, and has a hole for receiving push rod 50 in the center thereof. Core 56 is formed of a ferromagnetic material to be magnetized by a magnetic force produced by solenoid coil 64.

A solenoid assembly 68 shaped as a ring is provided to the outside of second chamber 26 by interposing a sealing member 70. Solenoid assembly 68 is formed by ring-shaped solenoid coil 64 and a bobbin 66 for being wound by solenoid coil 64. Here, bobbin 66 is integrally formed via a molding or the like to prevent entering of the fluid to solenoid coil 64 which winds therein. Additionally, solenoid assembly 68 is inserted to the outer circumference of cylindrical sealing member 70 to be sealed with second chamber 26 by sealing member 70, thereby being shielded from the fluid within second chamber 26. An electric terminal 71 is exposed to the outside of solenoid valve 100 to be connected to electric wires, so that an electric power is supplied to solenoid coil 64.

One end of cylindrical sealing member 70 is airtightly fixed to housing 20 via a processing, e.g., a caulking, and other end thereof is inserted to cover 22 to seal. Cover 22 is formed to let in a portion of armature 58, e.g., a groove is formed to insertedly receive one end of cylindrical sealing member 70 airtightly.

An unshown 0-shaped ring is installed around the outer circumference of plunger 48 to maintain the airtight state between first chamber 24 and second chamber 26 in case that outlet valve 40 is seated on outlet valve seating surface 55 to close outlet nozzle bore 60.

First, second and third o-shaped rings 72, 72' and 72' are provided to an L-shaped groove 74 and first and second U-shaped grooves 76 and 76' as formed in the outer plane of housing 20 to coaxially surround housing 20. First, second and third o-shaped rings 72, 72' and 72" are provided for maintaining the airtight state among inlet port 32, outlet port 34 and exhaust port 36 when solenoid valve 100 is installed to a modulator block for an anti-lock brake system. Accordingly, the installation of solenoid valve 100 can be completed only by inserting solenoid valve 100 into a valve space in the modulator block.

Figure 5:
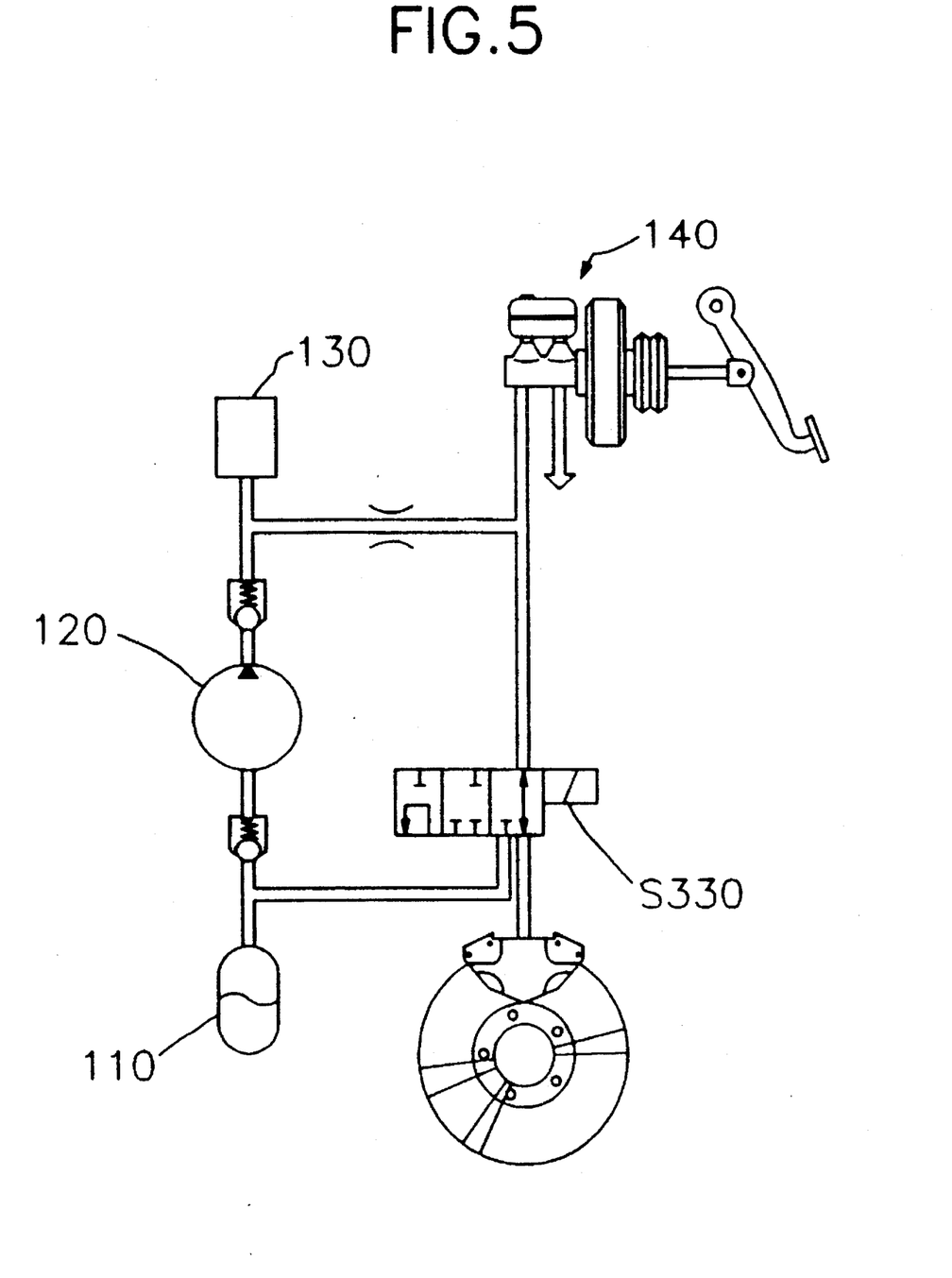
FIG. 5 is a schematic view showing a hydraulic system of an anti-lock brake system utilizing the 3-position 3-way solenoid valve.

FIG. 5 illustrates a schematic view showing a hydraulic system when the 3-position 3-way solenoid valve is utilized to construct the anti-lock brake system. Inlet port 32 is communicated with a master cylinder 140, outlet port 34 is communicated with a brake wheel cylinder (not shown) mounted to a wheel, and exhaust port 36 is communicated with the entrance of a pump 120 and an accumulator 110.

Hereinafter, an operation of solenoid valve 100 according to the present invention will be described with reference to FIGS. 3, 4 and 5.

Figure 4A:
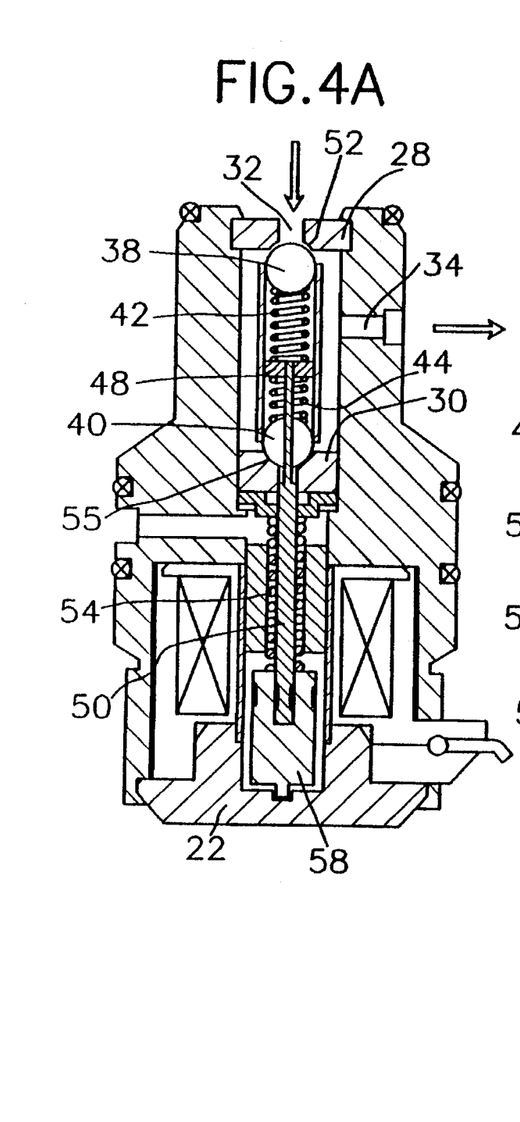
FIGS. 4A, 4B and 4C are sectional views showing an operating state of the 3-position 3-way solenoid valve according to the present invention in pressing, static pressure and draining modes, respectively.

In a increase mode, as shown in FIG. 4A, since solenoid valve 100 is supplied with no electric signal, outlet valve 40 is seated on outlet valve seating surface 55 by an elasticity of third spring 54 to close outlet nozzle 30. At this time, armature 58 is placed most adjacent to cover 22, and inlett valve 38 is maintained on first spring 42 by the fluid flowing to first chamber 24 through inlet port 32 since first spring 42 does not provide the elasticity to inlet valve 38.

An oil pressure generated by master cylinder 140 or pump 120 is supplied to the brake wheel cylinder communicated with outlet port 34 and mounted to wheels of a vehicle via inlet port 32 and outlet port 34, so that a braking pressure is raised.

Figure 4B:
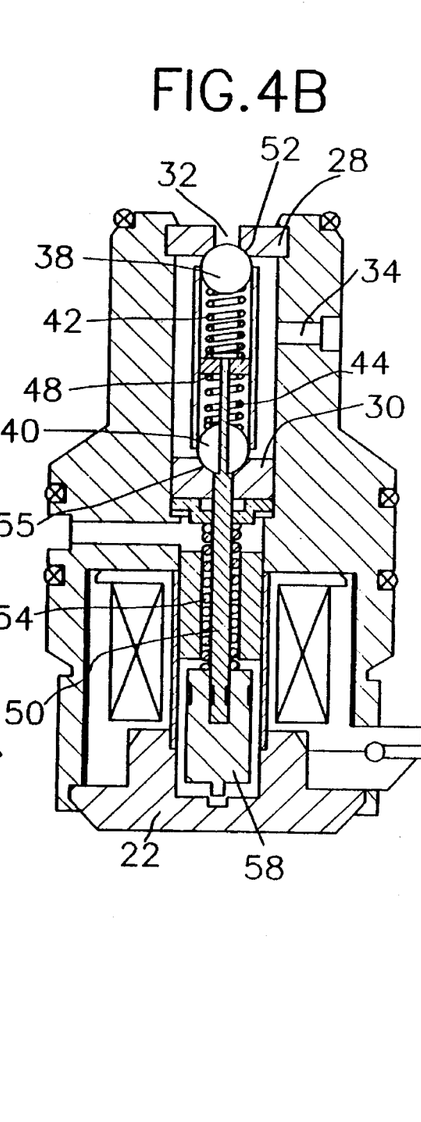

In a static mode, the first electric signal which is a half of maximum current is supplied to solenoid coil 64. By this operation, as shown in FIG. 4B, armature 58 overcomes the elasticity of third spring 54 to move to the center position of closing inlet port 32 by inlet valve 38 under the state that outlet nozzle 30 is closed. By the movement of armature 58, plunger 48 presses first spring 42. As the result, inlet valve 38 is seated onto inlet valve seating surface 52 to close inlet port 32.

As inlet port 32, outlet port 34 and exhaust port 36 are closed with respect to one another, the oil pressure of the brake wheel cylinder can be constantly maintained.

Figure 4C:
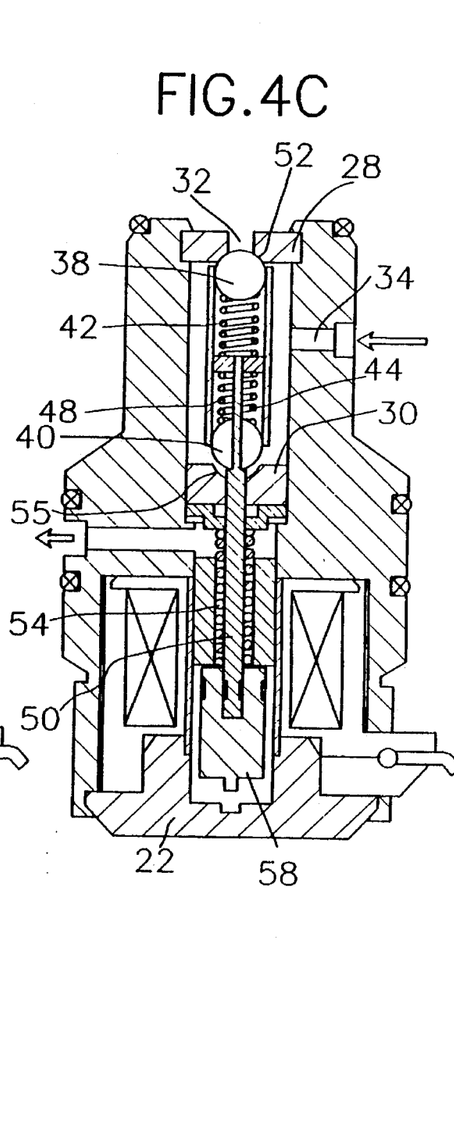

In a decrease mode, a second electric signal having the maximum current is supplied to solenoid coil 64. By this operation, as shown in FIG. 4C, armature 58 overcomes the elasticity of first and third springs 42 and 54 to be moved up to the maximum movement position. Outlet valve 40 is moved by enlarged portion 50A of push rod 50 to open outlet nozzle 30. At this time, inlet port 32 maintains the closing state.

Therefore, outlet port 34 and exhaust port 36 are communicated to each other, so that the oil pressure of the brake wheel cylinder is exhausted toward accumulator 110 communicated to exhaust port 36 via outlet port 34 and exhaust port 36, thereby decreasing the braking pressure.

The 3-position 3-way solenoid valve according to the present invention is formed by categorizing an electric part having electric elements and a hydraulic part associated with the fluid. The flow passage is not formed by piercing through the inside of the solenoid valve, and ports for admitting/discharging the fluid are formed in a half portion of the solenoid valve.

When the modulator is constructed by utilizing the solenoid valve according to the present invention, a flow passage connected to respective ports of the solenoid valve is formed only in the upper block of the modulator block. Consequently, the modulator is simply constructed to improve workability, while improving the assemblage since the assembling is completed only by inserting the solenoid valve into the modulator block.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A 3-position 3-way solenoid valve comprising:

a valve body having a housing with an inlet port for receiving fluid from a fluid generating source, an outlet port for admitting/discharging said fluid and an exhaust port for exhausting said fluid, and a cover airtightly coupled to said housing for closing one end of said housing;

a barrier wall for dividing chambers formed by said housing and cover within said valve body into a first chamber communicated with said inlet port and outlet port and a second chamber communicated with said exhaust port, having a barrier-wall hole for communicating said first chamber with said second chamber;

opening/closing means movable along the lengthwise direction of said valve body for selectively opening and closing said barrier-wall hole and inlet port in accordance with an electric signal, functioning by allowing said inlet port to communicate with said outlet port, said outlet port to communicate with said exhaust port and said inlet port, outlet port and exhaust port to be closed, and being placed at a first position of closing said barrier-wall hole in a normal state that said electric signal is not supplied, at a second position of closing said barrier-wall hole and inlet port in a first active state that a first electric signal being a half of maximum current is supplied and at a third state of opening said barrier-wall hole in a second active state that a second electric signal having the maximum current is supplied; and a solenoid assembly having a ring-shaped solenoid coil, a bobbin wound by said solenoid coil and an electrode electrically connected to said solenoid coil to be exposed to the outside of said valve body for moving said opening/closing means on said first position when said electric signal is not supplied to said second position upon the supply of said first electric signal and then to said third position upon the supply of said second electric signal.

2. A 3-position 3-way solenoid valve as claimed in claim 1, wherein said opening/closing means comprises:

valve means having an inlet valve for opening/closing said inlet port, an outlet valve with a thruhole for opening/closing said barrier-wall hole, a plunger between said inlet valve and outlet valve with o-shaped rings around the outer circumference thereof for preventing the leakage of said fluid, a first spring interposed between said inlet valve and plunger, a second spring interposed between said plunger and outlet valve, and a cylinder of which one end is fixed to said outlet valve and other end has steps for limiting the movement position of said inlet valve and accommodating said inlet valve, first spring, plunger and second spring therein;

an armature moved in response to a magnetic force produced by said solenoid assembly;

a push rod divided into an enlarged portion with a larger diameter and a reduced portion with a smaller diameter, one end of said enlarged portion fixed to said armature and extending to said first chamber via said barrier-wall hole and thruhole, one end of said reduced portion connected to said plunger;

a third spring for receiving said push rod therethrough, one end of which is supported by said barrier wall, other end of which is supported by said armature; and a core provided to said second chamber for receiving said third spring and push rod therethrough and pulling said armature by generating said magnetic force in response to a magnetic flux produced from said solenoid coil, whereby a diameter of said barrier-wall hole is determined to permit said enlarged portion of said push rod to pierce through, a diameter of said thruhole is determined to block said enlarged portion of said push rod while allowing for the penetration by said reduced portion, so that said end of said enlarged portion connected to said reduced portion at said first position is to be spaced from said outlet valve to permit said barrier-wall hole to maintain said closing state at said second position.

3. A 3-position 3-way solenoid valve as claimed in claim 1, wherein said inlet port is an inlet nozzle bore formed to an inlet nozzle airtightly coupled to other end of said housing in opposition to said housing closed by said cover, said barrier wall is formed by an outlet nozzle, said diameter of said barrier-wall hole formed in said outlet nozzle is formed to be larger than that of said enlarged portion of said push rod which pierces through said barrier-wall hole, whereby a predetermined clearance is formed between said barrier-wall hole and enlarged portion to communicate said first chamber with said second chamber via said clearance.

4. A 3-position 3-way solenoid valve as claimed in claim 3, wherein said first chamber is formed by said inlet nozzle, barrier wall and an inner wall of said housing, and said chamber is formed by said barrier wall, cover, a cylindrical sealing member and an said inner wall of said housing, whereby said cylindrical sealing member is inserted with said bobbin, one end of said cylindrical sealing member is airtightly coupled to said inner wall of said housing not to contact said fluid within said first chamber, and other end thereof is airtightly inserted into said cover.

5. A 3-position 3-way solenoid valve as claimed in claim 3, wherein said inlet nozzle is provided with an inlet valve seating surface for seating said inlet valve, and said outlet nozzle is provided with an outlet valve seating surface for seating said outlet valve, and said inlet valve seating surface and outlet valve seating surface are shaped to match with the shapes of said inlet valve and outlet valve to close said inlet port and barrier-wall hole when said inlet valve and outlet valve are seated on said inlet valve seating surface and outlet valve seating surface, respectively.

6. A 3-position 3-way solenoid valve as claimed in claim 2, further comprising a bushing for supporting said push rod between said armature and barrier wall within said second chamber.

7. A 3-position 3-way solenoid valve as claimed in claim 2, wherein said inlet valve and outlet valve are spherically shaped.

8. A 3-position 3-way solenoid valve as claimed in claim 1, wherein said housing is provided with an L-shaped groove, first and second U-shaped grooves accepting said o-shaped rings for maintaining the airtight state of respective ports by being operated with an inner wall of a modulator block in case of being mounted to said modulator block, and said L-shaped groove is formed to said one end of said housing provided with said inlet port, said first U-shaped groove is provided between said outlet port and exhaust port, and said second U-shaped groove is provided between said other end of said housing coupled with said cover and exhaust port.

9. A 3-position 3-way solenoid valve comprising:

a valve body having a housing with an inlet port for receiving fluid from a fluid generating source, an outlet port for admitting/discharging said fluid and an exhaust port for exhausting said fluid, and a cover airtightly coupled to said housing for closing one end of said housing;

a barrier wall for dividing chambers formed by said housing and cover within said valve body into a first chamber communicated with said inlet port and outlet port and a second chamber communicated with said exhaust port, having a barrier-wall hole for communicating said first chamber with said second chamber;

opening/closing means movable along the lengthwise direction of said valve body for selectively opening and closing said barrier-wall hole and inlet port in accordance with an electric signal, functioning by allowing said inlet port to communicate with said outlet port, said outlet port to communicate with said exhaust port and said inlet port, outlet port and exhaust port to be closed, and being placed at a first position of closing said barrier-wall hole in a normal state that said electric signal is not supplied, at a second position of closing said barrier-wall hole and inlet port in a first active state that a first electric signal being a half of maximum current is supplied and at a third state of opening said barrier-wall hole in a second active state that a second electric signal having the maximum current is supplied; and a solenoid assembly having a ring-shaped solenoid coil, a bobbin wound by said solenoid coil and an electrode electrically connected to said solenoid coil to be exposed to the outside of said valve body for moving said opening/closing means on said first position when said electric signal is not supplied to said second position upon the supply of said first electric signal and then to said third position upon the supply of said second electric signal, wherein said opening/closing means comprises:

valve means having an inlet valve for opening/closing said inlet port, an outlet valve with a thruhole for opening/closing said barrier-wall hole, a plunger between said inlet valve and outlet valve with o-shaped rings around the outer circumference thereof for preventing the leakage of said fluid, a first spring interposed between said inlet valve and plunger, a second spring interposed between said plunger and outlet valve, and a cylinder of which one end is fixed to said outlet valve and other end has steps for limiting the movement position of said inlet valve and accommodating said inlet valve, first spring, plunger and second spring therein;

an armature moved in response to a magnetic force produced by said solenoid assembly;

a push rod divided into an enlarged portion with a larger diameter and a reduced portion with a smaller diameter, one end of said enlarged portion fixed to said armature and extending to said first chamber via said barrier-wall hole and thruhole, one end of said reduced portion connected to said plunger;

a third spring for receiving said push rod therethrough, one end of which is supported by said barrier wall, other end of which is supported by said armature; and a core provided to said second chamber for receiving said third spring and push rod therethrough and pulling said armature by generating said magnetic force in response to a magnetic flux produced from said solenoid coil, whereby a diameter of said barrier-wall hold is determined to permit said enlarged portion of said push rod to pierce through, a diameter of said thruhole is determined to block said enlarged portion of said push rod while allowing for the penetration by said reduced portion, so that said end of said enlarged portion connected to said reduced portion at said first position is to be spaced from said outlet valve to permit said barrier-wall hole to maintain said closing state at said second position, wherein said inlet port is an inlet nozzle bore formed to an inlet nozzle airtightly coupled to other end of said housing in opposition to said housing closed by said cover, said barrier wall is formed by an outlet nozzle, said diameter of said barrier-wall hole formed in said outlet nozzle is formed to be larger than that of said enlarged portion of said push rod which pierces through said barrier-wall hole, whereby a predetermined clearance is formed between said barrier-wall hole and enlarged portion to communicate said first chamber with said second chamber via said clearance, wherein said first chamber is formed by said inlet nozzle, barrier wall and an inner wall of said housing, and said chamber is formed by said barrier wall, cover, a cylindrical sealing member and said inner wall of said housing, whereby said cylindrical sealing member is inserted with said bobbin, one end of said cylindrical sealing member is airtightly coupled to said inner wall of said housing not to contact said fluid within said first chamber, and other end thereof is airtightly inserted into said cover, wherein said inlet nozzle is provided with an inlet valve seating surface for seating said inlet valve, and said outlet nozzle is provided with an outlet valve seating surface for seating said outlet valve, and said inlet valve seating surface and outlet valve seating surface are shaped to match with the shapes of said inlet valve and outlet valve to close said inlet port and barrier-wall hole when said inlet valve and outlet valve are seated on said inlet valve seating surface and outlet valve seating surface, respectively, wherein said 3-position 3-way solenoid valve further comprises a bushing for supporting said push rod between said armature and barrier wall within said second chamber, wherein said inlet valve and outlet valve are spherically shaped, wherein said housing is provided with an L-shaped groove, first and second U-shaped grooves accepting said o-shaped rings for maintaining the airtight state of respective ports by being operated with an inner wall of a modulator block in case of being mounted to said modulator block, and said L-shaped groove is formed to said one end of said housing provided with said inlet port, said first U-shaped groove is provided between said outlet port and exhaust port, and said second U-shaped groove is provided between said other end of said housing coupled with said cover and exhaust port.

\* \* \* \* \*